United States Patent
Du et al.

(10) Patent No.: US 8,731,004 B2
(45) Date of Patent: May 20, 2014

(54) METHOD OF AND APPARATUSES FOR RECOGNIZING AN OUT-OF-SYNC BASE STATION

(75) Inventors: Jiuhui Du, Beijing (CN); Qingyu Miao, Beijing (CN); Huaisong Zhu, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 135 days.

(21) Appl. No.: 13/130,087

(22) PCT Filed: Dec. 1, 2008

(86) PCT No.: PCT/CN2008/001948
§ 371 (c)(1),
(2), (4) Date: May 19, 2011

(87) PCT Pub. No.: WO2010/063137
PCT Pub. Date: Jun. 10, 2010

(65) Prior Publication Data
US 2011/0228711 A1  Sep. 22, 2011

(51) Int. Cl.
*H04W 56/00* (2009.01)
(52) U.S. Cl.
USPC ........................................ 370/509; 455/456.1
(58) Field of Classification Search
None
See application file for complete search history.

(56) References Cited

U.S. PATENT DOCUMENTS

| | | | |
|---|---|---|---|
| 2002/0031100 A1 | 3/2002 | Sashihara | |
| 2003/0147362 A1* | 8/2003 | Dick et al. | 370/324 |
| 2005/0094715 A1* | 5/2005 | Hwang et al. | 375/148 |
| 2006/0068841 A1 | 3/2006 | Park | |
| 2007/0173279 A1* | 7/2007 | Kuroda et al. | 455/522 |
| 2008/0019279 A1* | 1/2008 | Kim et al. | 370/241 |
| 2008/0080448 A1* | 4/2008 | Rottinghaus | 370/342 |
| 2008/0123569 A1* | 5/2008 | Doss et al. | 370/280 |
| 2010/0054237 A1* | 3/2010 | Han et al. | 370/350 |
| 2013/0229983 A1* | 9/2013 | Dick et al. | 370/328 |

FOREIGN PATENT DOCUMENTS

| | | |
|---|---|---|
| CN | 1777062 A | 5/2006 |
| CN | 1798414 A | 7/2006 |

OTHER PUBLICATIONS

State Intellectual Property Office, P.R. China, First Office Action, Patent Application No. 200880132265.X, Dated: Dec. 1. 2008, 10 pages.
Third Office Action, State Intellectual Property Office, P.R. China, Application No. 200880132265.X, Application Date: Dec. 1, 2008, Title: Method of and Apparatuses for Recognizing an Out-of-Snc Base Station, Applicant: Ericcsson (China) Communications, Date of issue: Feb. 18, 2014, 6 pages.

* cited by examiner

*Primary Examiner* — Hassan Phillips
*Assistant Examiner* — Duc Duong
(74) *Attorney, Agent, or Firm* — Rothwell, Figg, Ernst & Manbeck, P.C.

(57) ABSTRACT

A method of and a network controller (304) for recognizing an out-of-sync BS in a TDD based cellular communication network is provided. The method comprises the steps of receiving information reported by one or more BSs having uplink interference from the out-of-sync BS (414), and locating the out-of-sync BS based on the information (416). A BS and an NMS for use with the above network controller (304) and a TDD based cellular communication network comprising at least the above network controller (304) and the above BS (306-1, 306-2, . . . , 306-n) are also provided.

18 Claims, 6 Drawing Sheets

METHOD OF AND APPARATUSES FOR RECOGNIZING AN OUT-OF-SYNC BASE STATION

CROSS-REFERENCE TO RELATED APPLICATIONS

This application is a 35 U.S.C. §371 National Phase Entry Application from PCT/CN2008/001948, filed Dec. 1, 2008, the disclosure of which is incorporated herein in its entirety by reference.

TECHNICAL FIELD

The present invention relates generally to a cellular communication network and, more particularly, to the recognition of an out-of-sync Base Station (BS) in a Time Division Duplex (TDD) based cellular communication network.

BACKGROUND

In general, TDD based cellular communication networks require strict time synchronization between network elements for proper performance. Examples of Such TDD based cellular communication networks include a Time Division-Synchronous Code Division Multiple Access (TD-SCDMA) network, a Worldwide Interoperability for Microwave Access (WiMAX) network, and a Long Term Evolution-Time Division Duplex (LTE-TDD) network.

Once a BS located in a cell in a TDD based cellular communication network loses synchronization, typically due to losing system timing such as a Global Positioning System (GPS) reference signal, it will generate a huge interference to its neighboring cells. As a result, some or all of its neighboring cells may be out of service. This is explained below in the context of a TD-SCDMA network as an example.

Figure 1A:
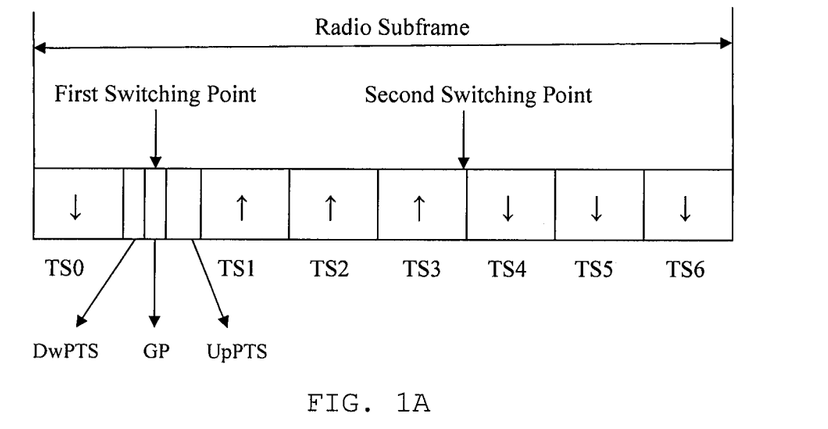
FIG. 1A schematically shows an exemplary radio subframe in a TD-SCDMA network.

In a TD-SCDMA network, uplink transmission and downlink transmission are on the same frequency band and switched in time domain. A TD-SCDMA radio frame is 10 ms in length, which is divided into two radio subframes. Each of the two radio subframes is 5 ms in length and comprises seven regular time slots (TS0-TS6), and three special time slots including a Downlink Pilot Time Slot (DwPTS), a Guard Period (GP), and an Uplink Pilot Time Slot (UpPTS), as schematically shown in FIG. 1A.

Figure 1B:
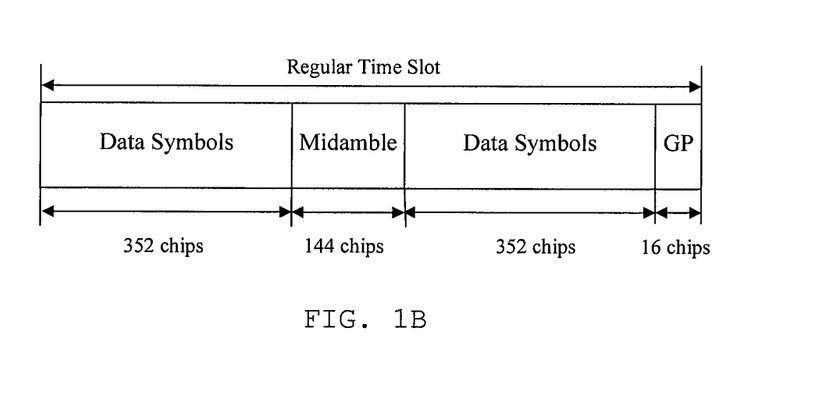
FIG. 1B schematically shows an exemplary regular time slot of the subframe of FIG. 1A.

The DwPTS, the GP, and the UpPTS in length are respectively 75 µs, 75 µs, and 125 µs, which respectively correspond to 96 chips, 96 chips, and 160 chips. Each of the seven regular time slots is 675 µs in length and comprises 864 chips. As schematically shown in FIG. 1B, each regular time slot sequentially comprises a block of 352 chips for data symbols, a block of 144 chips for midamble code, a block of 352 chips for data symbols, and a block of 16 chips for a Guard Period (GP).

In general, the time slot TS0 is always allocated to downlink transmission, and the time slot TS1 is always allocated to uplink transmission. Depending upon traffic requirements, the time slots TS2-TS6 can be allocated to downlink transmission and uplink transmission. FIG. 1A shows only one of several allocation ways of the time slots TS2-TS6.

Further, each radio subframe has two switching points. A first switching point for switching from downlink transmission to uplink transmission is always located in the GP between the time slots TS0 and TS1 due to the above allocation of the time slots TS0 and TS1. A second switching point for switching from uplink transmission to downlink transmission can be located in the GP of the last uplink time slot of the time slots TS1-TS5. The second switching point schematically illustrated in FIG. 1A is located at the end of the time slot TS3 which is the last uplink time slot of the time slots TS1-TS5.

It can be known from above that the GP in which the first switching point is located is 75 µs in length (i.e. 96 chips) and the GP in which the second switching point is located is 12.5 µs in length (i.e. 16 chips). In view of this and the above structure of the radio subframe, an inter-cell cross-slot interference occurs in two situations.

Figure 2A:
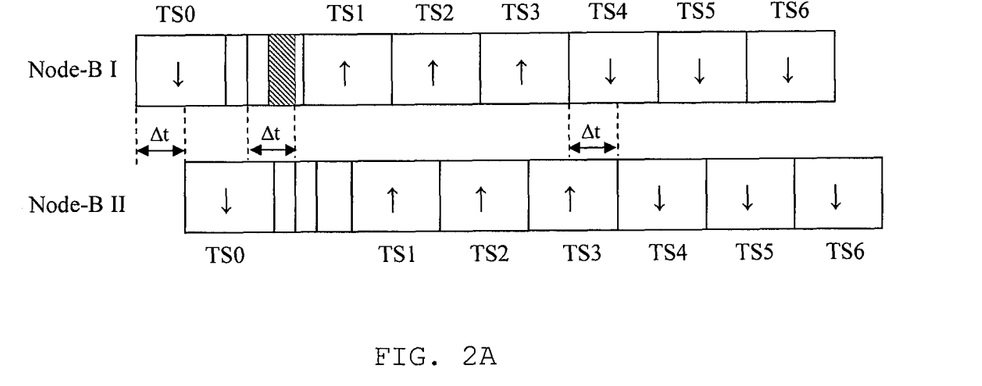
FIG. 2A schematically illustrates one situation in which an inter-cell cross-slot interference is resulted from an out-of-sync Node-B.

Referring now to FIG. 2A, there is schematically illustrated one situation in which an inter-cell cross-slot interference is resulted from an out-of-sync Node-B. In the figure, Node-B I is in perfect synchronization, whereas Node-B II is out of synchronization, whose radio subframe lags by a time Δt. It can be seen that the inter-cell cross-slot interference will occur as long as the time Δt is above 75 µs (i.e. 96 chips). The interference portion in the radio subframe of Node-B I is schematically illustrated by a hatched area.

Figure 2B:
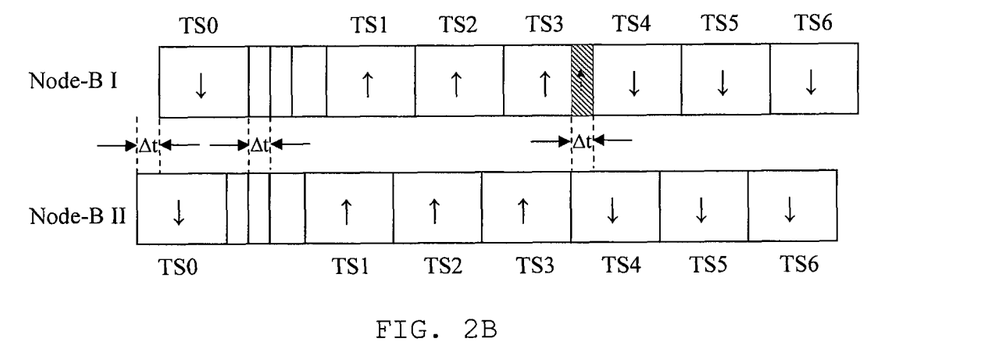
FIG. 2B schematically illustrates another situation in which an inter-cell cross-slot interference is resulted from an out-of-sync Node-B.

FIG. 2B schematically illustrates another situation in which an inter-cell cross-slot interference is resulted from an out-of-sync Node-B. In the figure, Node-B I is in perfect synchronization, whereas Node-B II is out of synchronization, whose radio subframe leads by a time Δt. It can be seen that the inter-cell cross-slot interference will occur as long as the time Δt is above 12.5 µs (i.e. 16 chips). The interference portion in the radio subframe of Node-B I is schematically illustrated by a hatched area.

In either case, the inter-cell cross-slot interference caused by the out-of-sync Node-B II results in a high Block Error Rate (BLER) of uplink reception of the synchronized Node-B I, mainly because the data symbols under the interference have a very high soft value which will adversely affect other soft values during decoding. In this way, the synchronized Node-B I may not operate properly☐ and thus a cell served by the synchronized Node-B I may be out of service. In fact, the out-of-sync Node-B II may adversely affect all its neighboring cells in a similar way. Therefore, network operators desire to recognize an out-of-sync Node-B as soon as possible in order to take actions to ensure network stability.

Although a Chinese patent CN 100361556C discloses a method of locating a source of uplink interference, the method has a number of disadvantages. For example, the method determines the existence of uplink interference in a very rough manner. Only one threshold for Received Signal Strength Indication (RSSI) or Received Total Wideband Power (RTWP) is set to determine the existence of the uplink interference, which is applicable only to detection of very strong interference and is not flexible in an actual implementation.

Accordingly, it would be desirable to provide a method of and a network controller for recognizing an out-of-sync BS in a TDD based cellular communication network to overcome the above disadvantages.

SUMMARY

Therefore, it is the object of the present invention to address the above disadvantages by providing a method of and apparatuses for recognizing an out-of-sync BS in a TDD based cellular communication network to improve network stability.

According to one aspect of the invention, there is provided a method of recognizing an out-of-sync BS in a TDD based cellular communication network. The method comprises the steps of receiving information reported by one or more BSs having uplink interference from the out-of-sync BS, and locating the out-of-sync BS based on the information, wherein the uplink interference is determined by a two-level threshold detection.

In an embodiment of the method, the information comprises the estimated Angles of Arrival (AoAs) for the uplink interferences of the one or more BSs, and the step of locating the out-of-sync BS based on the information comprises locating the out-of-sync BS based on the estimated AoAs of the one or more BSs.

In an embodiment of the method, the information comprises the uplink interference powers of the one or more BSs, and the step of locating the out-of-sync BS based on the information comprises locating the out-of-sync BS based on the uplink interference powers of the one or more BSs.

In an embodiment of the method, the step of locating the out-of-sync BS is followed by the step of performing an operation on the out-of-sync BS. Preferably, the operation comprises one or more of reporting the out-of-sync BS up to a higher level network entity in the TDD based cellular communication network, rebooting the out-of-sync BS, and disabling the out-of-sync BS.

In an embodiment of the method, the step of receiving the information is preceded by the steps contained in the two-level threshold detection for a Time Division-Synchronous Code Division Multiple Access (TD-SCDMA) network: for each of the one or more BSs, determining whether a chip-level power of its received signal in uplink is above a first threshold; determining whether a symbol-level interference power of its received signal is above a second threshold if the chip-level power of its received signal is not above a first threshold; and determining that it has the uplink interference from the out-of-sync BS if the chip-level power of its received signal is above the first threshold or the symbol-level interference power of its received signal is above the second threshold.

Preferably, the first threshold is a predefined power value, or a current average chip-level received signal power multiplied by a predefined ratio. More preferably, the current average chip-level received signal power is calculated by using a sliding time window.

In an embodiment of the method, the step of receiving the information is preceded by the steps contained in the two-level threshold detection for one of a Worldwide Interoperability for Microwave Access (WiMAX) network and a Long Term Evolution-Time Division Duplex (LTE-TDD) network: for each of the one or more BSs, determining whether an Orthogonal Frequency Division Multiplexing (OFDM)symbol level power of its received signal in uplink is above a first threshold; determining whether a symbol-level interference power of its received signal is above a second threshold if the OFDM symbol level power of its received signal is not above a first threshold; and determining that it has the uplink interference from the out-of-sync BS if the OFDM symbol level power of its received signal is above the first threshold or the symbol-level interference power of its received signal is above the second threshold.

Preferably, the first threshold is a predefined power value, or a current average OFDM symbol level received signal power multiplied by a predefined ratio. More preferably, the current average OFDM symbol level received signal power is calculated by using a sliding time window.

In an embodiment, the method further comprises the step of performing an AoA estimation on the uplink interference of each of the one or more BSs by means of a multiple antenna technology.

In an embodiment, the method further comprises the step of calculating the uplink interference power of each of the one or more BSs.

According to another aspect of the invention, there is provided a network controller for recognizing an out-of-sync BS in a TDD based cellular communication network. The network controller comprises one or more processing circuits configured to receive information reported by one or more BSs having uplink interference from the out-of-sync BS, and locate the out-of-sync BS based on the information.

In an embodiment of the network controller, the information comprises the estimated AoAs for the uplink interferences of the one or more BSs, and the one or more processing circuits of the network controller are configured to locate the out-of-sync BS based on the information by locating the out-of-sync BS based on the estimated AoAs for the uplink interferences of the one or more BSs.

In an embodiment of the network controller, the information comprises the uplink interference powers of the one or more BSs, and the one or more processing circuits of the network controller are configured to locate the out-of-sync BS based on the information by locating the out-of-sync BS based on the uplink interference powers of the one or more BSs.

In an embodiment of the network controller, the one or more processing circuits of the network controller is further configured to report the out-of-sync BS up to a Network Management System (NMS) in the TDD based cellular communication network.

In an embodiment of the network controller, the TDD based cellular communication network is one of a TD-SCDMA network, a WiMAX network, and an LTE-TDD network.

According to yet another aspect of the invention, there is provided a BS for use with the network controller as stated above for a TD-SCDMA network. The BS comprises one or more processing circuits configured to determine whether a chip-level power of its received signal in uplink is above a first threshold; determine whether a symbol-level interference power of its received signal is above a second threshold if the chip-level power of its received signal is not above a first threshold; and determine that it has the uplink interference from the out-of-sync BS if the chip-level power of its received signal is above the first threshold or the symbol-level interference power of its received signal is above the second threshold.

Preferably, the first threshold is a predefined power value, or a current average chip-level received signal power multiplied by a predefined ratio. More preferably, the current average chip-level received signal power is calculated by using a sliding time window.

According to yet another aspect of the invention, there is provided a BS for use with the network controller as stated above for one of a WiMAX network and an LTE-TDD network. The BS comprises one or more processing circuits configured to determine whether an OFDM symbol level power of its received signal in uplink is above a first threshold; determine whether a symbol-level interference power of its received signal is above a second threshold if the OFDM symbol level power of its received signal is not above a first threshold; and determine that it has the uplink interference from the out-of-sync BS if the OFDM symbol level power of its received signal is above the first threshold or the symbol-level interference power of its received signal is above the second threshold.

Preferably, the first threshold is a predefined power value, or a current average OFDM symbol level received signal power multiplied by a predefined ratio. More preferably, the current average OFDM symbol level received signal power is calculated by using a sliding time window.

In an embodiment, the one or more processing circuits of the BS are further configured to perform an AoA estimation on the uplink interference of the BS by means of a multiple antenna of the BS.

In an embodiment, the one or more processing circuits of the BS are further configured to calculate the uplink interference power of the BS.

According to yet another aspect of the invention, there is provided an NMS for use with the network controller as stated above. The NMS is configured to perform an operation on a reported out-of-sync BS. Preferably, the operation comprises one of rebooting the reported out-of-sync BS and disabling the reported out-of-sync BS.

According to yet another aspect of the invention, there is provided a TDD based cellular communication network comprising at least the above network controller and the above BS.

BRIEF DESCRIPTION OF THE DRAWINGS

The above and other aspects, features and advantages of the present invention will be more apparent from the following more particular description thereof, presented in conjunction with the accompanying drawings, in which.

Corresponding reference characters indicate corresponding components throughout the several views of the drawings.

DETAILED DESCRIPTION

The embodiments set forth below represent the necessary information to enable those skilled in the art to practice the invention and illustrate the best mode of the practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Throughout the description and claims of this specification, the terminology "BS" includes, but is not limited to, a base station, a Node-B, an evolved Node-B (eNode-B), or any other type of device with radio transmission/reception capabilities for providing radio coverage in part of a cellular communication network.

Figure 3:
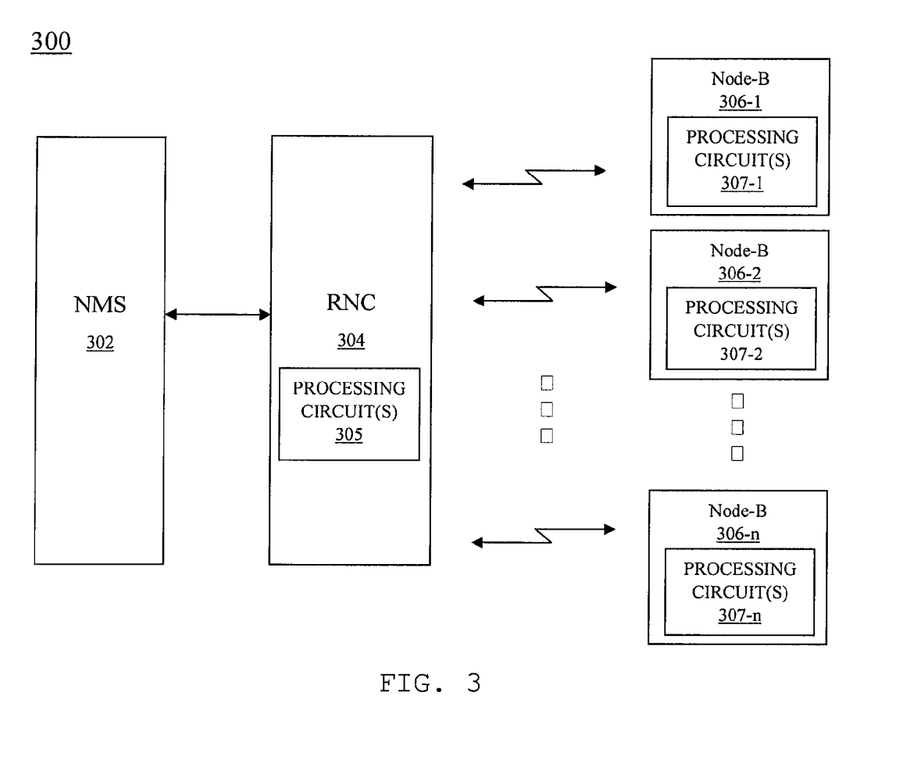
FIG. 3 is a schematic block diagram of a portion of a TD-SCDMA network in which one embodiment of the present invention is implemented.

FIG. 3 is a schematic block diagram of a portion 300 of a TD-SCDMA network in which one embodiment of the present invention is implemented. The portion 300 comprises a Network Management System (NMS) 302, a Radio Network Controller (RNC) 304 including one or more processing circuits 305, a Node-B 306-1 including one or more processing circuits 307-1, a Node-B 306-2 including one or more processing circuits 307-2, . . . , and a Node-B 306-n including one or more processing circuits 307-n, where n is a positive integer. The one or more processing circuits 307-1, 307-2, . . . , 307-n are configured to determine uplink interference from an out-of-sync Node-B and report information on the uplink interference up to the RNC 304. The one or more processing circuits 305 are configured to locate the out-of-sync Node-B based on the reported information and report a cell identity of the out-of-sync Node-B up to the NMS 302.

It should be understood that the one or more processing circuits 305 and 307-1, 307-2, . . . , 307-n may comprise hardware, software, or any combination thereof. In at least one embodiment, the one or more processing circuits 305 and 307-1, 307-2, . . . , 307-n include one or more general or special purpose microprocessor and/or digital signal processor that are programmed to carry out operations corresponding to the method steps as discussed below. Such instructions may be embodied as one or more computer programs comprising stored program instructions in a storage element (e.g., memory).

Figure 4A:
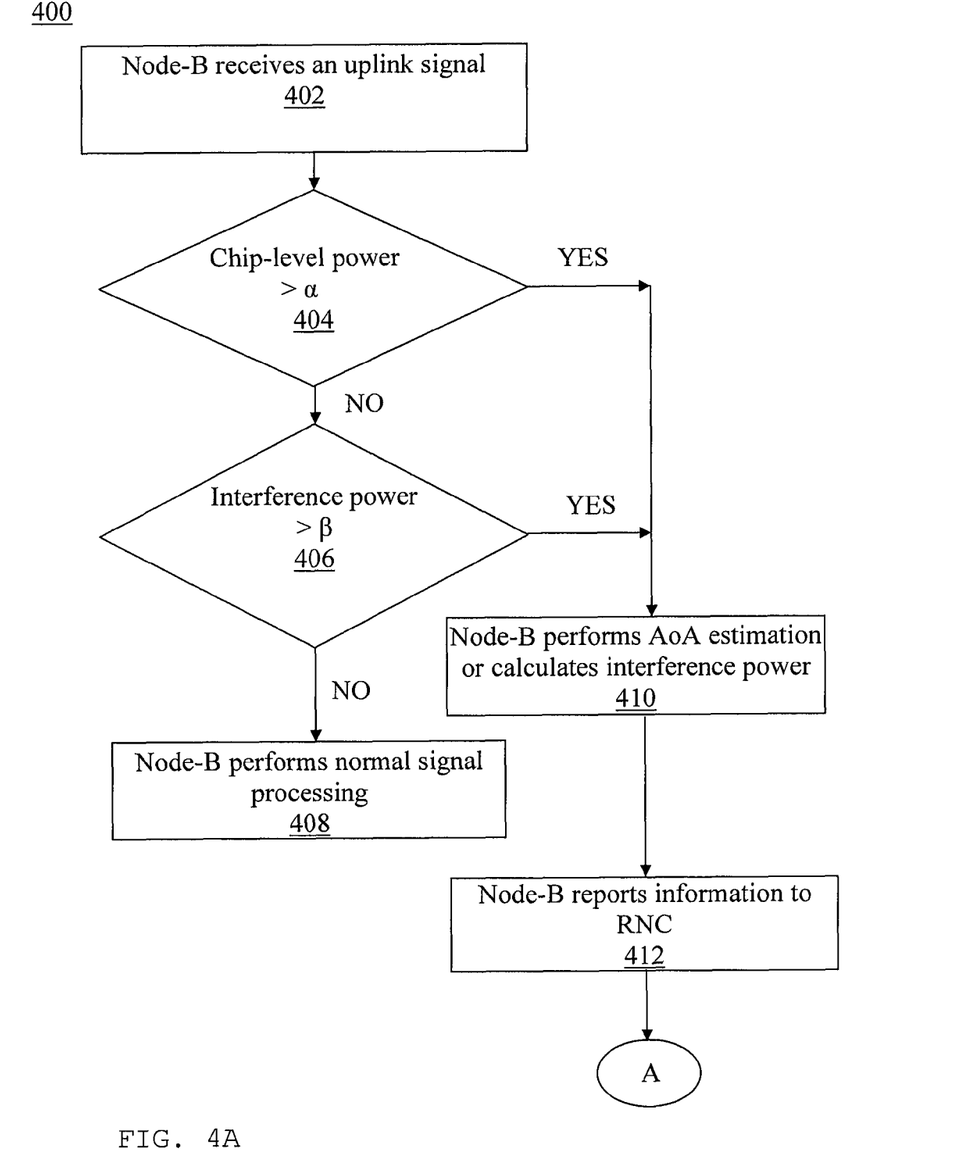
FIGS. 4A and 4B schematically illustrate a flowchart of a method of recognizing an out-of-sync Node-B in the TD-SCDMA network in accordance with an embodiment of the present invention.
Figure 4B:
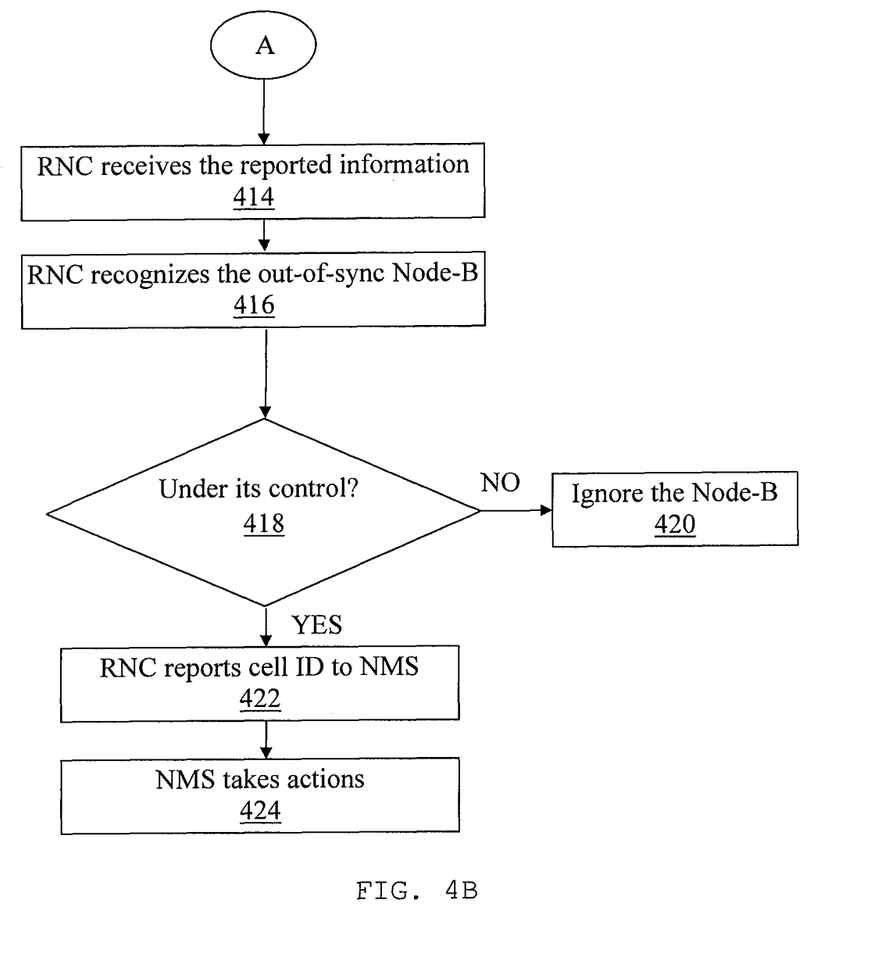

A process for recognizing an out-of-sync Node-B will be described below in conjunction with FIGS. 4A and 4B. Referring to FIGS. 4A and 4B, there is shown a flow chart illustrating a method 400 of recognizing an out-of-sync Node-B in the TD-SCDMA network in accordance with an embodiment of the present invention. It should be understood that the method is not necessarily limited to the illustrated sequence, some steps may be omitted as desired, and some steps may be performed together or otherwise in an interrelated fashion.

The method begins with step 402 in which each of the Node-B 306-1, the Node-B 306-2, . . . , the Node-B 306-n receives an uplink signal. In uplink, an inter-cell cross-slot interference caused by a surrounding out-of-sync Node-B is generally much higher than other interference such as Multiple Access Interference (MAI) from User Equipments (UEs) in a cell. So a threshold can be set to filter out the inter-cell cross-slot interference originating from the surrounding out-of-sync Node-B.

A two-level threshold detection is utilized in embodiments of the present invention to recognize uplink interference from an out-of-sync Node-B. For the TD-SCDMA network as shown in FIG. 3, the "two-level" means that an interference is detected on both chip and symbol levels. The chip-level detection is based on a total received signal power regardless of signal or interference, and the symbol-level detection is based on separation of signal and interference. The chip-level detection is preferably performed prior to the symbol-level detection to quicken determination of the uplink interference from the out-of-sync Node-B.

Similarly, in the case of a WiMAX network or an LTE-TDD network, the "two-level" means that an interference is detected on both OFDM symbol and symbol levels. The OFDM symbol-level detection is based on a total received signal power regardless of signal or interference, and the symbol-level detection is based on separation of signal and interference. The OFDM symbol-level detection is preferably performed prior to the symbol-level detection to quicken determination of the uplink interference from the out-of-sync Node-B.

Turning to the TD-SCDMA network as shown in FIG. 3, before channel estimation and join detection, the each Node-B determines whether a chip-level power of its received uplink signal is above a first threshold a in step 404. The first threshold a can be a predefined power value, which could result in erroneous report in the case of very good channel condition. Alternatively, the first threshold a can be a current average chip-level received signal power multiplied by a predefined ratio, which could reduce possibility of the above erroneous report. The current average chip-level received signal power can be calculated by using a sliding time window with a predefined window size.

Similarly, in the case of a WiMAX network or an LTE-TDD network, before channel estimation and join detection, the each Node-B determines whether an OFDM symbol level power of its received uplink signal is above a first threshold a in step 404. The first threshold a can be a predefined power value, which could result in erroneous report in the case of very good channel condition. Alternatively, the first threshold a can be a current average OFDM symbol level received signal power multiplied by a predefined ratio, which could reduce possibility of the above erroneous report. The current average OFDM symbol level received signal power can be calculated by using a sliding time window with a predefined window size.

If the answer in step 404 is NO, the method 400 proceeds to step 406 where the each Node-B determines whether a symbol-level interference power of its received uplink signal is above a second threshold β. If the answer in step 406 is NO indicating that the each Node-B does not receive the uplink interference from the out-of-sync Node-B, the method 400 proceeds to step 408 where the each Node-B performs normal signal processing.

If the answer in step 404 is YES or if the answer in step 406 is YES, indicating that the each Node-B does receive the uplink interference from the out-of-sync Node-B, the method 400 proceeds to step 410 where the each Node-B performs an AoA or Direction of Arrival (DoA) estimation for the uplink interference by means of a multiple antenna technology.

It should be noted that in general the purpose of an uplink AoA estimation is to obtain weighting factors for downlink beam-forming. To this end, only the AoA of a desired signal, but not that of uplink interference, is estimated. With the invention, however, the AoA estimation of the uplink interference is required and only direction information of the uplink interference is useful.

In the TD-SCDMA network illustrated in FIG. 3, a smart antenna (not shown) is used for estimating the AoA of the uplink interference by means of phase shifts of the received uplink signal arriving at multiple antenna elements therein during uplink reception.

Alternatively, in step 410 the each Node-B can calculate the interference power of its received uplink signal for example by means of a single antenna technology, a multiple antenna technology, or a combination thereof, rather than perform the AoA estimation.

Then, in step 412 the each Node-B reports information on the estimated AoA for the uplink interference from the out-of-sync Node-B or the calculated interference power of its received uplink signal up to its serving RNC 304. All the above steps of the method 400 are performed in the each Node-B.

Figure 5:
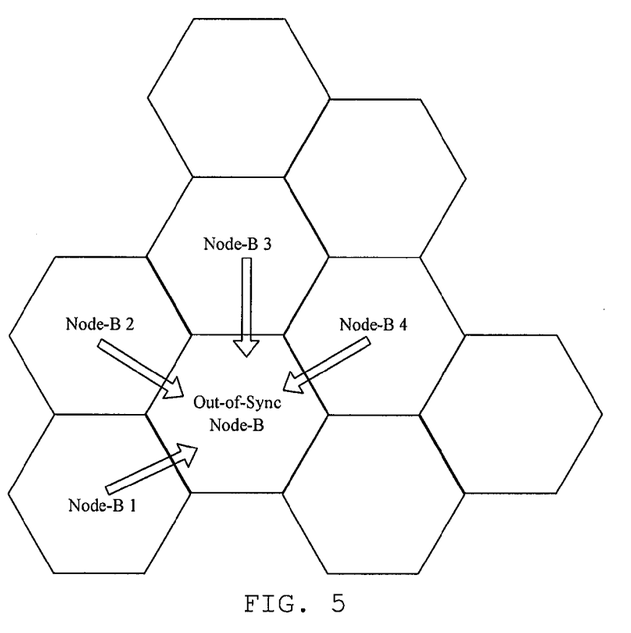
FIG. 5 schematically illustrates an exemplary scenario in which a first way to locate an out-of-sync Node-B is carried out.

Turning to FIG. 4B, the RNC 304 receives the reported information from the each Node-B in step 414 and then locates the out-of-sync Node-B based on the reported information in step 416. There are different ways for the RNC 304 to locate the out-of-sync Node-B. In a first exemplary embodiment, the RNC 304 may locate the out-of-sync Node-B by means of the estimated AoAs for the reported uplink interference from the out-of-sync Node-B. FIG. 5 schematically illustrates an exemplary scenario in which the first way is carried out.

As shown in FIG. 5, a serving RNC (not shown) receives the estimated AoAs reported by Node-Bs 1-4 having uplink interference from an out-of-sync Node-B, and determines respective directions where respective uplink interference sources of Node-Bs 1-4 are possibly located relative to respective locations of Node-Bs 1-4 according to the reported estimated AoAs. Since the uplink interferences of Node-Bs 1-4 are caused by the same out-of-sync Node-B, the respective directions must converge at a certain point or area. The specific position of the certain point or the specific range of the certain area can be calculated via numerous ways, for example, via solving a system of equation. Then, it can be determined that a cell where the certain point or area is located is a cell where the out-of-sync Node-B is located. Thus, the out-of-sync Node-B is recognized, as shown in FIG. 5.

Figure 6:
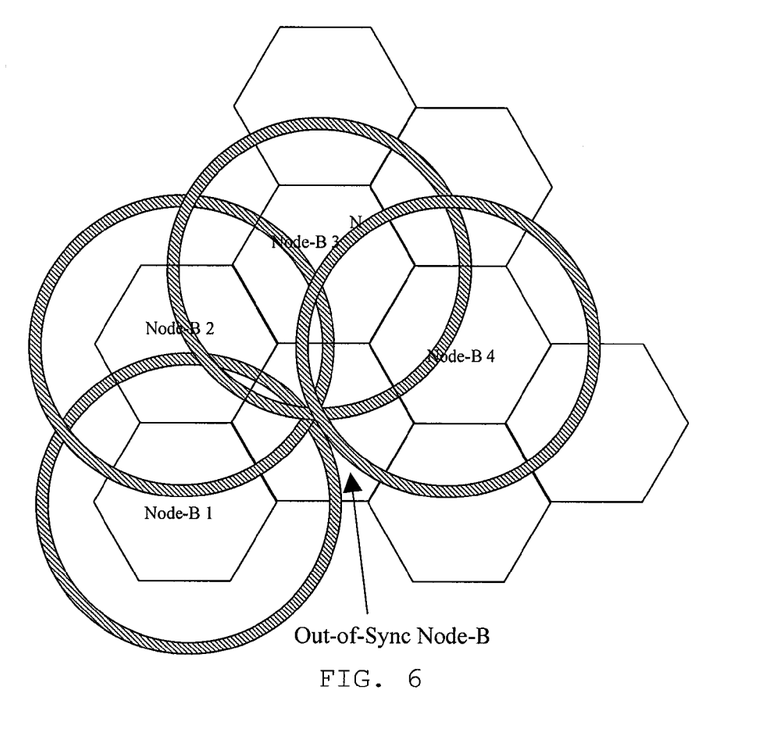
FIG. 6 schematically illustrates an exemplary scenario in which a second way to locate an out-of-sync Node-B is carried out.

In a second exemplary embodiment, the RNC 304 may locate the out-of-sync Node-B by means of the reported interference powers from the out-of-sync Node-B. FIG. 6 schematically illustrates an exemplary scenario in which the second way is carried out. As shown in FIG. 6, a serving RNC (not shown) receives the interference powers reported by Node-Bs 1-4 having uplink interference from an out-of-sync Node-B. And then, the serving RNC determines respective rings where respective uplink interference sources of Node-Bs 1-4 are possibly located relative to respective locations of Node-Bs 1-4 according to the magnitudes of the reported interference powers. Since the uplink interferences of Node-Bs 1-4 are caused by the same out-of-sync Node-B, the respective rings must converge at a certain area. The specific range of the certain area can be calculated via numerous ways, for example, via solving a system of equation. Then, it can be determined that a cell where the certain area is located is a cell where the out-of-sync Node-B is located. Thus, the out-of-sync Node-B is recognized, as shown in FIG. 6.

Once the RNC 304 recognizes the out-of-sync Node-B in either of the above two ways, the method 400 proceeds to step 418 where the RNC 304 determines whether the out-of-sync Node-B is under its control.

If the answer in step 418 is NO, the method 400 proceeds to step 420 where the RNC 304 will ignore the out-of-sync Node-B. Alternatively, the RNC 304 can report information on the out-of-sync Node-B to the NMS 302 or even inform its surrounding RNC of the information, which may complicate the network.

If the answer in step 418 is YES, the method 400 proceeds to step 422 where the RNC 304 will report a cell identity (ID) of the out-of-sync Node-B as an Operation and Maintenance (O&M) error up to a higher network entity, which is the NMS 302 in the example.

In step 424, based on identification of the out-of-sync Node-B, the NMS 302 disables the out-of-sync Node-B, or takes other actions, for example, reboots the out-of-sync Node-B.

The method 400 illustrated in FIGS. 4A and 4B is performed automatically in the TD-SCDMA network. Therefore, once a Node-B becomes out of synchronization, it will be recognized by the TD-SCDMA network soon to facilitate further actions of the network. As a result, the robustness of the network is greatly improved.

The method of the embodiment of the present invention provides very good performance especially under the circumstance that an out-of-sync Node-B is located in a center region of its serving RNC coverage. In this case, the serving RNC can easily recognize the out-of-sync Node-B due to the fact that almost all of its surrounding Node-Bs will suffer severe interference from the out-of-sync Node-B and report it.

Further, in the case of Node-Bs built on a track, e.g. Node-Bs serving a railway or a highway in a relative open area, the method of the embodiment of the present invention can also easily recognize an out-of-sync Node-B, because Node-Bs at both sides of the out-of-sync Node-B will suffer severe interference and report it.

The method illustrated in FIGS. 4A and 4B applies not only to a TD-SCDMA network, but also to a WiMAX network, an LTE-TDD network, or any other TDD based cellular communication network.

In particular, for a WiMAX network, an Access Service Network Gateway (ASNGW) will be substituted for the RNC 304 if the method of FIGS. 4A and 4B is applied. For an LTE-TDD network, an evolved Node-B (eNode-B) will be substituted for each of the Node-Bs 306-1, 306-2, ..., 306-n, and a Mobility Management Entity (MME) for the RNC 304, if the method of FIGS. 4A and 4B is applied.

Throughout the description and claims of this specification, the words "comprise", "include", and variations of the words, for example "comprising" and "comprises", means "including but not limited to", and is not intended to (and does not) exclude other components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

It will be understood that the foregoing description of the embodiments of the invention has been presented for purposes of illustration and description. This description is not exhaustive and does not limit the claimed invention to the precise forms disclosed. Modifications and variations are possible in light of the above description or may be acquired from practicing the invention. The claims and their equivalents define the scope of the invention.

The invention claimed is:

1. A method of recognizing an out-of-sync Base Station (BS) in a Time DivisionDuplex (TDD) based cellular communication network, comprising the steps of:
   receiving information reported by one or more BSs having uplink interference from the out-of-sync BS; and
   locating the out-of-sync BS based on the information, wherein:
   the information comprises at least one of: i) respective estimated Angles of Arrival (AoAs) for the uplink interferences of the one or more BSs or ii) the uplink interference powers of the one or more BSs, and
   the step of locating the out-of-sync BS based on the information comprises locating the out-of-sync BS based on at least one of: i) the estimated AoAs of the one or more BSs or ii) the uplink interference powers of the one or more BSs.

2. The method according to claim 1, wherein the step of locating the out-of-sync BS is followed by the step of performing an operation on the out-of-sync BS.

3. The method according to claim 2, wherein the operation comprises one or more of reporting the out-of-sync BS up to a higher level network entity in the TDD based cellular communication network, rebooting the out-of-sync BS, and disabling the out-of-sync BS.

4. The method according to claim 1, wherein the step of receiving the information is preceded by the steps contained in the two-level threshold detection for one of a Worldwide Interoperability for Microwave Access (WiMAX) network and a Long Term Evolution-Time Division Duplex (LTE-TDD) network:
   for each of the one or more BSs:
   determining whether an Orthogonal Frequency Division Multiplexing (OFDM) symbol level power of its received signal in uplink is above a first threshold;
   determining whether a symbol-level interference power of its received signal is above a second threshold if the OFDM symbol level power of its received signal is not above a first threshold; and
   determining that it has the uplink interference from the out-of-sync BS if the OFDM symbol level power of its received signal is above the first threshold or the symbol-level interference power of its received signal is above the second threshold.

5. The method according to claim 4, wherein the first threshold is a predefined power value, or a current average OFDM symbol level received signal power multiplied by a predefined ratio.

6. The method according to claim 1, further comprising the step of performing an AoA estimation on the uplink interference of each of the one or more BSs by way of a multiple antenna technology.

7. The method according to claim 1, further comprising the step of calculating the uplink interference power of each of the one or more BSs.

8. The method according to claim 1, wherein the uplink interference is determined by a two-level threshold detection.

9. A network controller for recognizing an out-of-sync Base Station (BS) in a Time Division Duplex (TDD) based cellular communication network, said network controller comprising one or more processing circuits configured to:
   receive information reported by one or more BSs having uplink interference from the out-of-sync BS; and
   locate the out-of-sync BS based on the information, wherein
   the information comprises at least one of: i) the estimated Angles of Arrival (AoAs) for the uplink interferences of the one or more BSs or ii) the uplink interference powers of the one or more BSs, and
   the one or more processing circuits of the network controller are configured to locate the out-of-sync BS based on the information by locating the out-of-sync BS based on at least one of: i) the estimated AoAs for the uplink interferences of the one or more BSs or ii) the uplink interference powers of the one or more BSs.

10. The network controller according to claim 9, wherein the one or more processing circuits of the network controller is further configured to report the out-of-sync BS up to a Network Management System (NMS) in the TDD based cellular communication network.

11. The network controller according to claim 9, wherein the TDD based cellular communication network is one of a Time Division-Synchronous Code Division Multiple Access (TD-SCDMA) network, a Worldwide interoperability for Microwave Access (WiMAX) network, and a Long Term Evolution-Time Division Duplex (LTE-TDD) network.

12. A Base Station (BS) for use with the network controller according to claim 9 for one of a WiMAX network and an LTE-TDD network, the BS comprises one or more processing circuits configured to:
- determine whether an Orthogonal Frequency Division Multiplexing (OFDM) symbol level power of its received signal in uplink is above a first threshold;
- determine whether a symbol-level interference power of its received signal is above a second threshold if the OFDM symbol level power of its received signal is not above a first threshold; and
- determine that it has the uplink interference from the out-of-sync BS if the OFDM symbol level power of its received signal is above the first threshold or the symbol-level interference power of its received signal is above the second threshold.

13. The BS according to claim 12, wherein the first threshold is a predefined power value, or a current average OFDM symbol level received signal power multiplied by a predefined ratio.

14. The BS according to claim 12, wherein the one or more processing circuits of the BS are further configured to perform an AoA estimation on the uplink interference of the BS by means of a multiple antenna of the BS.

15. The BS according to claim 12, wherein the one or more processing circuits of the BS are further configured to calculate the uplink interference power of the BS.

16. A Network Management System (NMS) for use with the network controller according to claim 9, wherein the NMS is configured to perform an operation on a reported out-of-sync BS.

17. The NMS according to claim 16, wherein the operation comprises one of rebooting the reported out-of-sync BS and disabling the reported out-of-sync BS.

18. A method of determining the location of an out-of-sync base station (BS), the method comprising the steps of:
- a first BS detecting that it has received uplink interference from an out-of-sync BS;
- the first BS, in response to detecting that it has received uplink interference from the out-of-sync BS, transmitting to a controller first information related to a direction of the uplink interference received by the first BS;
- a second BS detecting that it has received uplink interference from the out-of-sync BS;
- the second BS, in response to detecting that it has received uplink interference from the out-of-sync BS, transmitting to said controller second information related to a direction of the uplink interference received by the second BS;
- the controller using the first and second information received from the first BS and the second BS, respectively, to estimate an area; and
- the controller identifying the out-of-sync BS based on the estimated area.

* * * * *

UNITED STATES PATENT AND TRADEMARK OFFICE
CERTIFICATE OF CORRECTION

| | | |
|---|---|---|
| PATENT NO. | : 8,731,004 B2 | Page 1 of 1 |
| APPLICATION NO. | : 13/130087 | |
| DATED | : May 20, 2014 | |
| INVENTOR(S) | : Du et al. | |

It is certified that error appears in the above-identified patent and that said Letters Patent is hereby corrected as shown below:

On the title page, item (56), under "OTHER PUBLICATIONS", in Column 2, Line 6, delete "Out-of-Snc" and insert -- Out-of-Sync --, therefor.

In the Specification

Column 7, Line 8, delete "threshold a" and insert -- threshold $\alpha$ --, therefor.

Column 7, Line 9, delete "threshold a" and insert -- threshold $\alpha$ --, therefor.

Column 7, Line 11, delete "threshold a" and insert -- threshold $\alpha$ --, therefor.

Column 7, Line 21, delete "threshold a" and insert -- threshold $\alpha$ --, therefor.

Column 7, Line 22, delete "threshold a" and insert -- threshold $\alpha$ --, therefor.

Column 7, Lines 24-25, delete "threshold a" and insert -- threshold $\alpha$ --, therefor.

In the Claims

Column 9, Line 50, in Claim 1, delete "Time DivisionDuplex (TDD)" and insert -- Time Division Duplex (TDD) --, therefor.

Signed and Sealed this
Eleventh Day of November, 2014

Michelle K. Lee
*Deputy Director of the United States Patent and Trademark Office*